United States Patent

Asbrand et al.

[11] Patent Number: 6,129,111
[45] Date of Patent: Oct. 10, 2000

[54] DAMPER VALVE CONFIGURATION

[75] Inventors: Ulrich Asbrand, Alfdorf; Martin Suelberg, Ostfildern; Thomas Schuler, Ebersbach, all of Germany

[73] Assignees: DaimlerChrysler AG, Stuttgart; IndustrieHansa Industrie-, Entwicklungs- Und Planungs-GmbH, Fellbach, both of Germany

[21] Appl. No.: 09/319,722
[22] PCT Filed: Dec. 10, 1997
[86] PCT No.: PCT/EP97/06886
  § 371 Date: Aug. 2, 1999
  § 102(e) Date: Aug. 2, 1999
[87] PCT Pub. No.: WO98/25807
  PCT Pub. Date: Jun. 18, 1998

[30] Foreign Application Priority Data

Dec. 11, 1996 [DE] Germany .............. 196 51 500

[51] Int. Cl.⁷ ...................................... B62D 5/06
[52] U.S. Cl. ............................. 137/468; 180/442
[58] Field of Search ................ 137/468, 601.2, 137/601.21; 180/442

[56] References Cited

U.S. PATENT DOCUMENTS 2,358,988  9/1944  Magrum ................ 137/468

FOREIGN PATENT DOCUMENTS 44 23 658   1/1996   Germany .
739281      of 0000  U.S.S.R. .

*Primary Examiner*—John Fox
*Attorney, Agent, or Firm*—Evenson, McKeown, Edwards & Lenahan, PLLC

[57] ABSTRACT

A damper valve arrangement is combined with a servomotor of a hydraulic power steering system to form a steering damper. Certain valve elements are adjusted by bimetallic components in order to compensate for temperature-dependent changes in the viscosity of the hydraulic medium.

20 Claims, 3 Drawing Sheets

A

B

C

DAMPER VALVE CONFIGURATION

BACKGROUND AND SUMMARY OF THE INVENTION

The invention relates to a damper valve arrangement suitable for hydraulic power steering systems, in which a servomotor of the system is designed as a hydrostatic motor unit or as a hydraulic displacer unit. The servomotor also acts as a steering damper. At least one damper valve arrangement is provided in hydraulic lines between the servomotor and the servovalve, having a first flow path which can be controlled by a first liftable valve element in the manner of a non-return valve, and a second flow path which can be controlled with a damping action by a second valve element.

Modern motor vehicles are generally fitted with a power steering system which, at least in passenger cars, generally operates using auxiliary hydraulic force such that the forces which the driver has to apply when actuating the vehicle steering system are always kept at a sufficiently low level.

If a steering damper arrangement is required in order to avoid or suppress vibrations in the steering system, according to German patent document DE-A 40 29 156 it is possible for a double-acting piston-cylinder unit serving as the servomotor to also act as a steering damper. This can occur if damper valve arrangements are provided in the lines between the piston-cylinder unit and the servovalve which is used to control this unit. Via the lines, the piston-cylinder unit can be connected to a hydraulic pressure source and a relatively unpressurized hydraulic reservoir in a controllable manner.

An arrangement which is similar in principle is described in German patent document DE-A 41 06 310.

It is known from German patent document DE-A 29 27 039 (having a counterpart in Great Britain GB 20 51 714 A) to arrange a non-return valve at each of the cylinder-side ports of the lines which connect the servovalve to the double-acting piston-cylinder unit of the power steering system. The non-return valves open toward the respective piston working chamber and are provided with a passage-restricting bore. The casings of the valves may be formed by a screw which is used to attach the corresponding line to the cylinder.

According to German patent document DE 43 23 179 A1, in order to simplify the damper valve arrangements, the damper valve elements are arranged on a perforated-disc-like valve support part. The holes of the support part (through which hydraulic medium passes) can be controlled by spring-loaded valve plates or small valve plates which are held on the valve support part on the end face through the use of bolts. The valve support part may be clamped (in the manner of a spacer ring or a spacer disc) between a bearing surface of a connection piece which is arranged on the casing of the servovalve or of the servomotor and a mating bearing surface of the connection part, which can be joined to the connection piece, of the hydraulic line in question.

As an alternative, it is also possible to hold the valve support part captively in the connection piece or in the connection part, as illustrated, for example, in German patent document DE 44 23 658 A1.

The object of the present invention is to provide a novel damper valve arrangement which can function optimally even under changing operating conditions.

This and other objects are achieved by means of a damper valve arrangement suitable for a hydraulic power steering system, the servomotor of which is designed as a hydrostatic motor unit or as a hydraulic displacer unit while also acting as a steering damper. At least one damper valve arrangement is provided in hydraulic lines between the servomotor and servovalve, having a first flow path, which can be controlled by a first liftable valve element in the manner of a non-return valve, and a second flow path, which can be controlled with a damping action by a second valve element. The first valve element is designed as a liftable rotary slide valve which is rotationally adjustable as a function of temperature and, in the event of rotational adjustment, closes or opens, in the non-return direction, the first flow path and/or a bypass.

The invention is based on the general concept of compensating for temperature-dependent changes in the viscosity of the hydraulic medium and the associated change in the flow resistances in the non-return direction, by opening a flow path. The flow path bypasses the restrictive second valve element, to an increasing extent at low temperature, when the hydraulic medium becomes comparatively viscous.

In principle, this ensures that the first valve element, firstly due to its lifting mobility, interacts with flow paths which it controls in the manner of a non-return valve, and, by means of an additional rotational mobility, is able to open the above-mentioned flow paths and/or a bypass independently of its lifting position.

According to a preferred embodiment of the invention, the damper valve arrangement has a support part which is in the form of a perforated disc. The bores in the disc form the flow paths. A spring-loaded valve plate interacts with some of the bores in the manner of a non-return valve. Rotation of the valve plate allows one or more openings or cutouts in the plate to be made to overlap, to a greater or lesser extent, with at least one bore which is controlled by the valve plate.

The rotation of the valve plate can be brought about by using bimetallic elements which, if appropriate, may at the same time assume the function of a closure spring which displaces the valve plate towards the support part.

BRIEF DESCRIPTION OF THE DRAWINGS

Furthermore, with regard to preferred features of the invention, reference is made to the claims and to the following explanation of the drawings, which are used to describe preferred embodiments of the invention and in which:

DETAILED DESCRIPTION OF THE DRAWINGS

Figure 1:
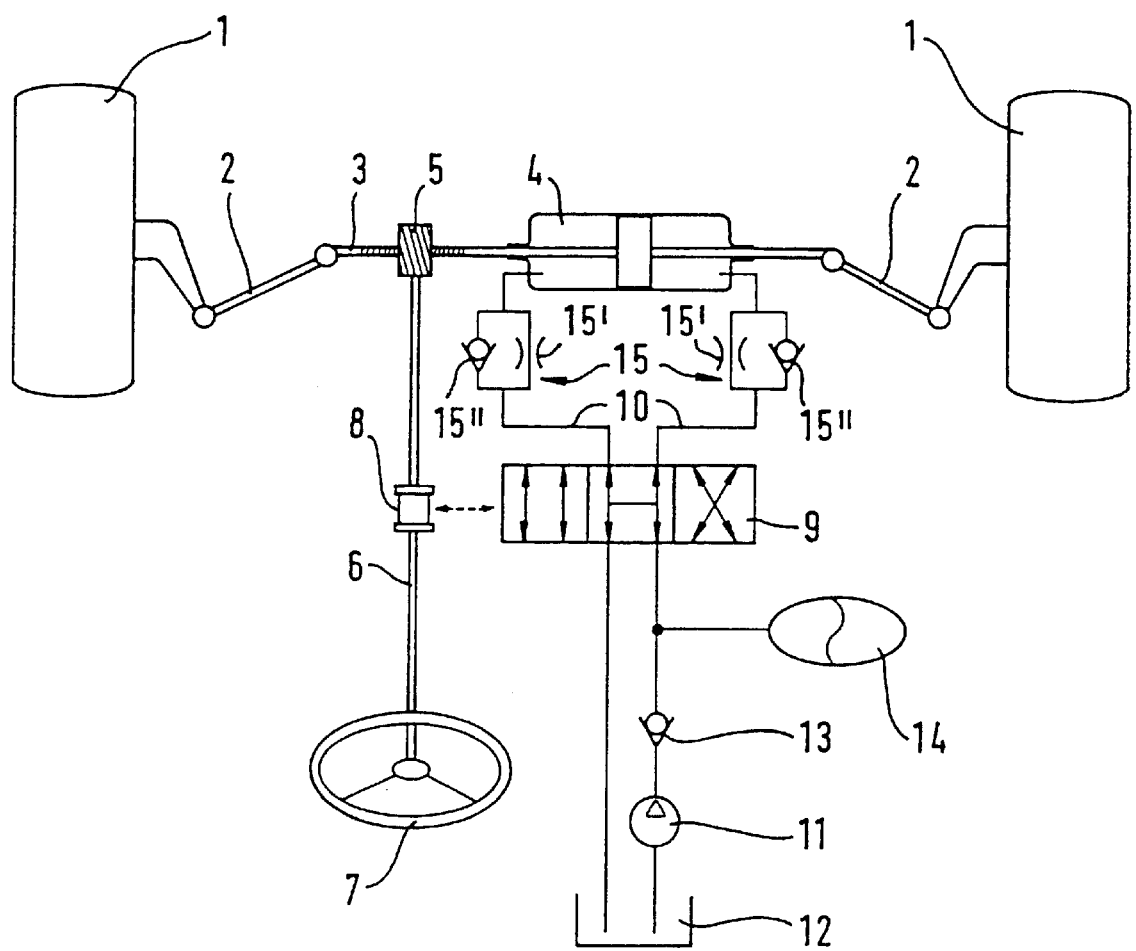
FIG. 1 is a circuit diagram of a hydraulic power steering system with damper valves on the servomotor.

In accordance with FIG. 1, a motor vehicle (not shown in more detail) has front steered vehicle wheels 1 which, in the example illustrated, are connected via steering tie rods 2 to a rack 3. The rack 3 merges coaxially into the piston rod of a double-acting piston-cylinder unit 4 arranged as the servomotor. Alternatively, the rack 3 is connected to the piston rod.

The rack 3 meshes with a pinion 5 which, in drive terms, is connected to a steering wheel 7 via a steering column 6.

A rotationally elastic element 8 is arranged in the steering column 6, so that a limited relative rotation between pinion 5 and steering wheel 7 is possible, the extent of which rotation is dependent on the forces and torques transmitted between the pinion 5 and the steering wheel 7.

This relative rotation controls a servovalve 9 which, via motor lines 10, is connected to the two chambers of the piston-cylinder unit 4. Furthermore, the servovalve 4 is connected to the delivery side of a hydraulic pump 11 and a relatively unpressurized hydraulic reservoir 12, to which the suction side of the pump 11 is also connected.

In the illustrated (FIG. 1) middle position of the servovalve 9, the two chambers of the piston-cylinder unit 4 are connected to one another and to the reservoir 12. Moreover, there may be a connection to the delivery side of the pump 11, which in this case may run continuously.

As an alternative embodiment, the servovalve 9 may also be designed such that in its middle position the valve connection to the delivery side of the pump 11 is blocked. In this case, the pump 11 may charge a pressure reservoir 14 via a non-return valve 13 and may be controlled as a function of the charging pressure or switched off at high charging pressure.

As soon as forces or torques act between the pinion 5 and the steering wheel 7, the servovalve 9 is moved out of its middle position in one direction or the other.

The result of this movement is that a greater or lesser pressure difference in one direction or the other is generated (and therefore a greater or lesser booster force for the piston-cylinder unit 4 in one or other direction) between the motor lines 12. Therefore, the force which has to be applied to the steering wheel 7 for a steering maneuver is correspondingly reduced.

In the steering system according to the invention, the piston-cylinder unit 4 which acts as a servomotor also assumes the function of a steering damper for damping rapid changes in the steering angle of the vehicle steered wheels 1. For this purpose, damper valves 15 are arranged in each of the lines 10 (or preferably at each of the connections of the lines 10 to the piston-cylinder unit 4). The damper valves are diagrammatically depicted in FIG. 1 as restrictors 15' and parallel non-return valves 15" which, in each case, open in the event of flow towards the piston-cylinder unit 4. In the event of a lifting movement of the piston of the piston-cylinder unit 4, since in each case one of the restrictors 15' of the damper valves 15 becomes active, rapid movements of the piston of the piston-cylinder unit 4, and correspondingly rapid steering adjustments of the vehicle steered wheels 1, are damped.

According to the invention, the damping action of the damper valves 15 changes as a function of the temperature, as explained below.

Figure 2:
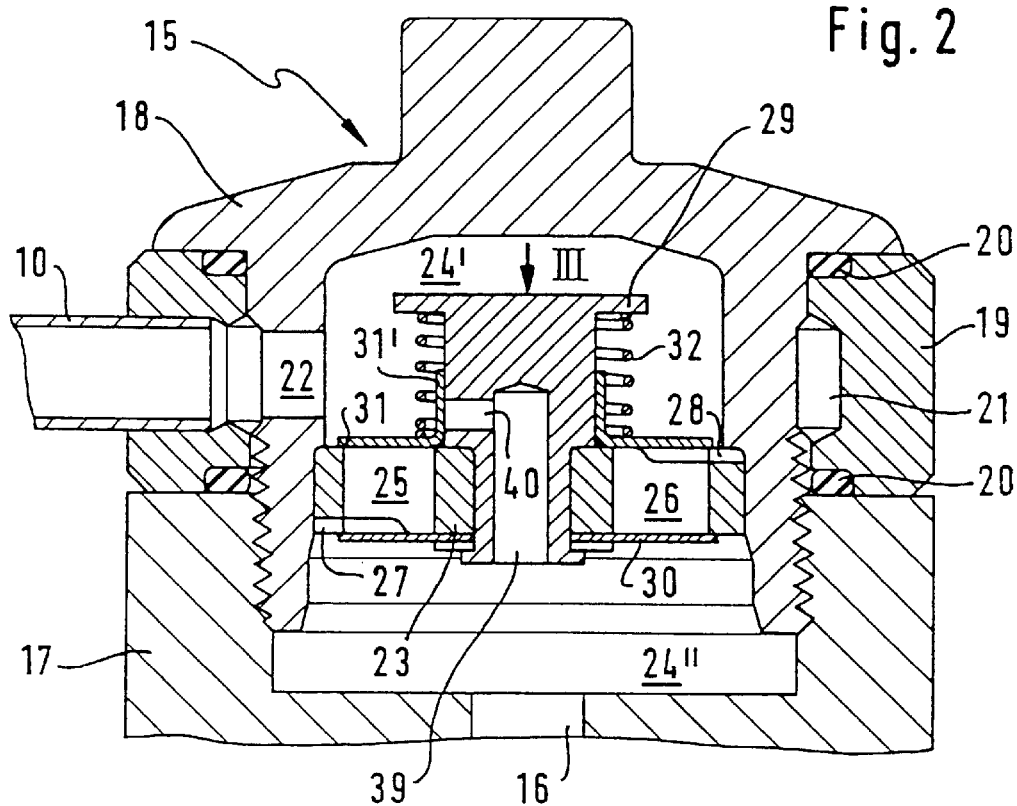
FIG. 2 is a sectional illustration of a damper valve arrangement.

FIG. 2 shows the cross-sectional structure of the damper valve 15.

Inside an internally threaded part 17, a port 16 is arranged coaxially with respect to the axis of the screw thread and is provided for each motor line 10 on the casing of the servovalve 9. A hat-shaped connection part 18 which bears an external screw thread is screwed into the internally threaded part 17. A holding ring 19, which is fixedly connected to the motor line 10, is axially clamped between mutually opposite flange faces on the internally threaded part 17, on the one hand, and on the connection part 18, on the other hand. The gaps between the end faces of the holding ring 19 and the associated flange faces of the internally threaded part 17 and of the connection part 18 are sealed in a pressure-tight manner via sealing rings 20.

On its internal circumference, the holding ring 19 has a duct 21 which is designed in the manner of an annular groove and is in communication with the motor line 10 on the one hand and with one or more radial bores 22 in the connection part 18 on the other hand. This produces a connection between the motor line 10 and the interior of the connection part 18.

A support part 23, which is in the form of a circular disc or a piston, is held fixedly and captively inside the connection part 18. The support part, inside the connection part 18, separates a chamber 24' which adjoins the radial bore or radial bores 22 from a chamber 24" which adjoins the port 16.

The support part 23 has axial bores 25 and 26. The axial bores 25 open into a recess 27 on the bottom end face (in FIG. 2) of the support part 23 which is opened towards the chamber 24". The axial bores 26 open into a similar recess 28 on the top end face (in FIG. 2) of the support part 23.

A bolt 29 is held in a central opening in the support part 23. On one end face of the support part 23 (in the example shown in FIG. 2 on the bottom end face of the support part 23), the bolt 29 secures at least one spring plate 30 which is in the form of a circular disc. On the other end face of the support part 23, the bolt is designed as an axial guide for an annular disc 31.

The spring plate or spring plates 30 are dimensioned such that they at least substantially overlap the axial bores 26 in the support part 23 and leave relatively large areas of the recesses 27 associated with the axial bores 25 clear. The annular disc 31 is dimensioned such that it is able to cover the axial bores 25 and leaves relatively large areas of the recesses 28 associated with the axial bores 26 clear.

On its internal circumferential edge, the annular disc 31 may have a sleeve-shaped extension 31', which surrounds the bolt 29 with a slight radial clearance for the purpose of axially displaceable guidance on the bolt 29. A helical compression spring 32, which presses the annular disc 31 towards the support part 23, is clamped between the annular disc 31 and a flange arranged on the free end of the bolt 29.

In normal situations, the damper valve 15 illustrated in FIG. 2 functions as follows:

In the case of flow from the connection opening 16 to the motor line 10, the hydraulic medium passes through the axial bores 25 in the support part 23, the annular disc 31 being lifted counter to the force of the helical compression spring 32, which is generally relatively low.

In the event of an opposite direction of flow, i.e. in the event of flow from the motor line 10 to the port 16, the annular disc 31 is displaced towards the support part 23, so that annular disc 31 interacts with the support part 23 in the manner of a non-return valve and blocks the axial bores 25. The hydraulic medium then flows through the axial bores 26, via the recesses 28 which have been left clear by the annular disc 31. As a result the spring plates 30 are bent to a greater or lesser extent away from the bottom end face of the support part 23, resulting in a considerable throttling resistance to the fluid flow.

If, at very low temperatures, the viscosity of the hydraulic medium should fall considerably, thus making the hydraulic medium "viscous", this throttling resistance may adopt very extreme values. In order to prevent steering from becoming excessively heavy in such an event, there is provision, according to the invention, for the annular disc 31 to be designed in the manner of a rotary slide valve which, at low temperature, opens the axial bores 25, which are controlled by the annular disc 31, to a greater or lesser extent for flow also to take place from the motor line 10 to the connection opening 16.

This is explained below.

Figures 3, 4:
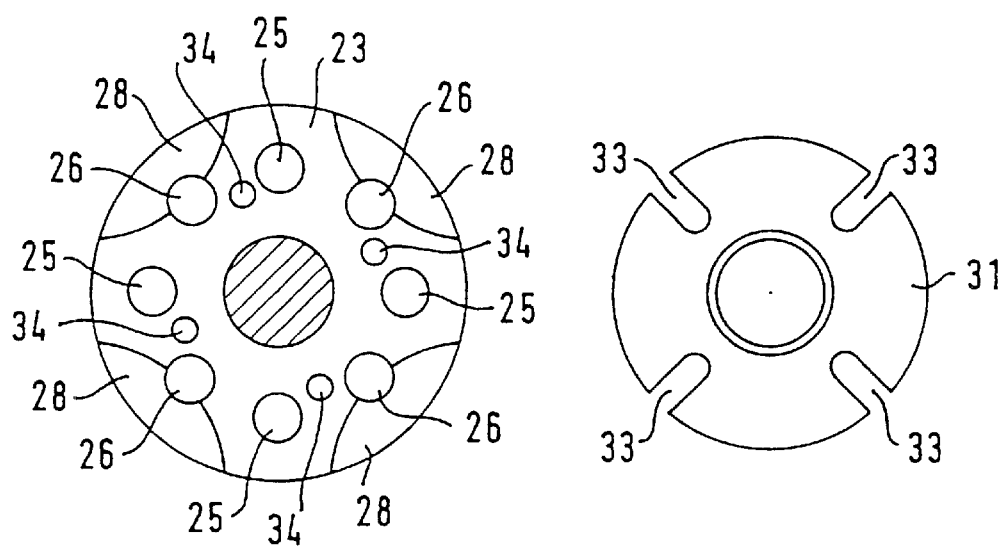
FIG. 3 is a plan view of a valve plate, in the direction of the arrow III shown in FIG. 2.
FIG. 4 is a plan view of a support part, in the direction of the arrow III shown in FIG. 2.

In accordance with FIG. 3, the annular disc 31 has a plurality of cutouts or windows 33. In accordance with FIG. 4, the support part 23 has, on its side facing towards the annular disc 31, a plurality of recesses 28. Relatively large areas of the recesses 28 cannot be covered by the annular disc 31 so that a connection to the axial bores 26 which start from the recesses 28 always remains open. The axial bores 25 which are controlled by the annular disc 31 are arranged between the recesses 28.

At normal operating temperatures, the annular disc 31 adopts a rotational position in which the cutouts or windows 33 lie outside the cross sections of the axial bores 25. At lower temperatures, the annular disc 31 is rotated to an increasing extent with respect to its normal position, with the result that the cutouts or windows 33 and the open cross sections of the axial bores 25 overlap one another to a greater or lesser extent. Therefore, the axial bores 25 are opened to a greater or lesser extent when the annular disc 31 bears against that side of the support part 23 which faces it.

The shape of the cutouts or windows 33 may differ from the shape of the cross sections of the axial bores 25, for example in such a manner that the cross section of the axial bores 25 which is opened by the cutouts or windows 33 grows progressively when the annular disc 31 is successively rotated further by constant angles of rotation.

If appropriate, in addition to the axial bores 25 and 26, bypass openings 34 may be arranged in the support part 23. The bypass openings are arranged both outside the recesses 27 and outside the recesses 28 (cf. FIG. 2) and are opened by cutouts or windows 33 in the annular disc 31 only at relatively low temperatures. At normal temperatures, these bypass openings 34, in the event of flow from the port 16 towards the motor line 10, are kept closed by the spring plates 30, while in the opposite direction of flow they are covered by the annular disc 31. At low temperatures, the hydraulic medium, in the event of flow from the motor line 10 towards the port 16, may enter the bypass openings 34 and flow through these openings counter to the resistance of the spring plates 30.

Therefore, at low temperatures, the cross section through which medium can flow counter to the resistance of the spring plates 30 is increased by means of the bypass openings 34 which are then opened.

In addition, or as an alternative, a central blind bore 39 may be provided in accordance with FIG. 2. The bore 39 is open towards the chamber 24" and is arranged in the bolt 29. The blind bore is in communication, above the support part 23, with a radial bore 40. Under normal operating conditions, this radial bore 40 is blocked by the sleeve-shaped extension 31' of the annular disc as soon as this disc bears against the support part 23. At low temperatures, the annular disc 31 is rotationally adjusted such that the radial bore 40 moves into the open cross section of a cutout (not shown) which is arranged in the extension 31' and which may, for example, be designed as an axial slot in the extension 31'. This opens a connection between the chambers 24' and 24" irrespective of the lifting position of the annular disc 31.

FIGS. 5A–5C shows possible examples allowing rotational adjustment of the annular disc 31.

In accordance with FIG. 5A, a helical compression spring 32 designed as a bimetallic spring is provided such that the ends of the spring rotate relative to one another, with respect to the helix axis, in the event of temperature changes. In this case, one end of the spring is connected to the flange on the free end of the bolt 29 in such a manner that it cannot rotate with respect to the helical spring axis, while the other end of the spring is coupled to the annular disc 31 in a suitably rotational manner. At the same time, the ends of the springs may each be secured in the circumferential direction between stops 35 or on holding devices on the flange of the bolt 29 and on the annular disc 31.

In the example shown in FIG. 5B, the helical compression spring 32 is designed as a conventional steel spring or the like and, at its (bottom) end facing towards the annular disc 31, is connected to a spiral bimetallic spring 36. The ends of the bimetallic spring 36 execute a rotational movement relative to one another in the circumferential direction in the event of temperature changes. That end of the helical compression spring 32 which is remote from the annular disc 31 is again held on the flange of the bolt 29 by stops 35 so that it cannot rotate, while that end of the bimetallic spring 36 which projects from the helical compression spring 32 is held on stops 35 or the like on the annular disc 31.

In the example shown in FIG. 5C, a bimetallic lever 37 is held on the free end of the bolt 29, the free end of which lever moves in the circumferential direction with respect to the axis of the bolt 29 in the event of temperature changes. The free end of the lever 37 engages in an axial slot in an angled-off section 38 on the annular disc 31, so that the rotational position of the annular disc 31 is determined by the position of the free end of the bimetallic lever 37, but the axial lifting movement of the annular disc 31 is not impeded by this lever 37.

Figure 5:
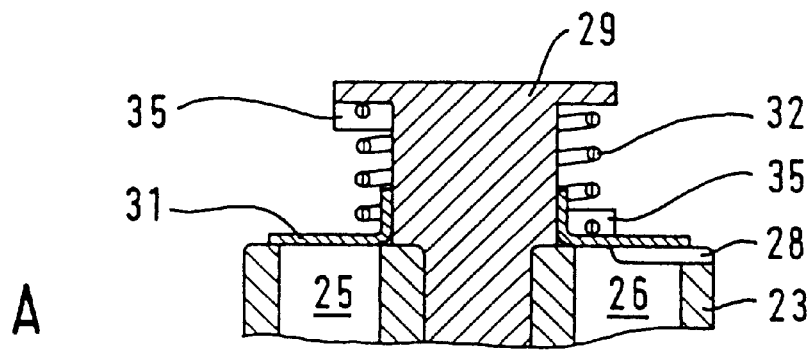
FIGS. 5A–5C show a number of variants for controlling the rotation of the valve plate.
Figure 5:
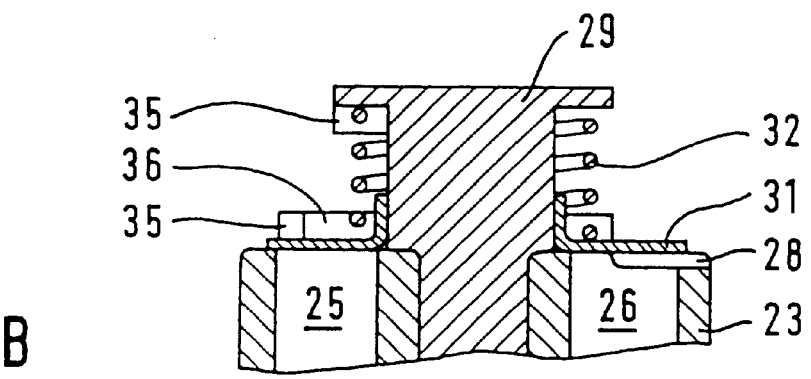
Figure 5:
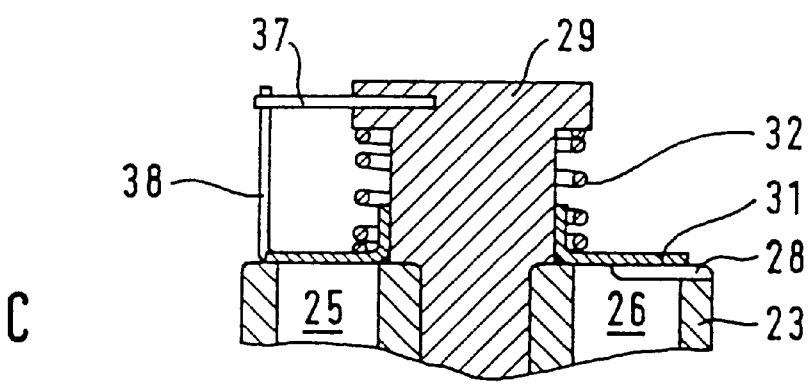

In all the embodiments illustrated in FIG. 5, therefore, in the event of temperature changes in the hydraulic medium 31, the annular disc 31 executes rotational movements, in the manner of a rotary slide valve, so that the cross sections of the axial bores 25 and/or of the bypass openings 34 are then opened to a greater or lesser extent, when the annular disc 31 is resting on the support part 23.

What is claimed is:

1. A damper valve arrangement for a hydraulic power steering system in which a servomotor is designed as one of a hydrostatic motor and a hydraulic displacer unit while acting as a steering damper, comprising:

at least one damper valve arranged in hydraulic lines between the servomotor and a servovalve, said damper valve having a first flow path controlled by a first liftable valve element as a non-return valve, and a second flow path controlled with a damping action via a second valve element;

wherein the first valve element is a liftable rotary slide valve rotationally adjustable as a function of temperature, and wherein in an event of a rotational adjustment, said first valve element opens or closes in a non-return direction at least one of the first flow path and a bypass, said first flow path and bypass being controlled with a damping action by the second valve element.

2. The damper valve arrangement according to claim 1, wherein the first valve element is a liftable annular disk which interacts with associated bores in the manner of a non-return valve, and further wherein said annular disk is provided with cutouts which, via a temperature-dependent rotational adjustment of the annular disk, are made to overlap to a greater or lesser extent the bypass bores and/or ducts of the first flow path controlled by the annular disk.

3. The damper valve arrangement according to claim 1, wherein the first valve element is an annular disk having an adjustable lifting travel and a sleeve-shaped extension, by which the annular disk is guided in an axially displaceable manner on a bolt, and further wherein a cutout is arranged in the extension, which cutout is made to overlap to a greater or lesser extent a duct arranged in the bolt via a rotational adjustment of the annular disk, said duct being arranged parallel to the ducts of the first flow path controlled by the annular disk via lifting movements.

4. The damper valve arrangement according to claim 2, wherein the first valve element is an annular disk having an adjustable lifting travel and a sleeve-shaped extension, by which the annular disk is guided in an axially displaceable manner on a bolt, and further wherein a cutout is arranged in the extension, which cutout is made to overlap to a greater or lesser extent a duct arranged in the bolt via a rotational adjustment of the annular disk, said duct being arranged parallel to the ducts of the first flow path controlled by the annular disk via lifting movements.

5. A damper valve arrangement according to claim 1, wherein the first valve element is assigned a lifting and return spring designed as a bimetallic element, said spring being connected at one end to a stationary abutment and at another end to the first valve element to serve as an actuator for rotational adjustment.

6. A damper valve arrangement according to claim 2, wherein the first valve element is assigned a lifting and return spring designed as a bimetallic element, said spring being connected at one end to a stationary abutment and at another end to the first valve element to serve as an actuator for rotational adjustment.

7. A damper valve arrangement according to claim 3, wherein the first valve element is assigned a lifting and return spring designed as a bimetallic element, said spring being connected at one end to a stationary abutment and at another end to the first valve element to serve as an actuator for rotational adjustment.

8. The damper valve arrangement according to claim 1, wherein the first valve element is a bimetallic lever forming a rotational actuator.

9. The damper valve arrangement according to claim 2, wherein the first valve element is a bimetallic lever forming a rotational actuator.

10. The damper valve arrangement according to claim 3, wherein the first valve element is a bimetallic lever forming a rotational actuator.

11. The damper valve arrangement according to claim 5, wherein the first valve element is a bimetallic lever forming a rotational actuator.

12. The damper valve arrangement according to claim 1, wherein a bimetallic spring is arranged between a lifting and restoring spring assigned to the first valve element and said first valve element, said bimetallic spring operating as a rotational adjuster for the first valve element.

13. The damper valve arrangement according to claim 2, wherein a bimetallic spring is arranged between a lifting and restoring spring assigned to the first valve element and said first valve element, said bimetallic spring operating as a rotational adjuster for the first valve element.

14. The damper valve arrangement according to claim 3, wherein a bimetallic spring is arranged between a lifting and restoring spring assigned to the first valve element and said first valve element, said bimetallic spring operating as a rotational adjuster for the first valve element.

15. The damper valve arrangement according to claim 5, wherein a bimetallic spring is arranged between a lifting and restoring spring assigned to the first valve element and said first valve element, said bimetallic spring operating as a rotational adjuster for the first valve element.

16. The damper valve arrangement according to claim 8, wherein a bimetallic spring is arranged between a lifting and restoring spring assigned to the first valve element and said first valve element, said bimetallic spring operating as a rotational adjuster for the first valve element.

17. A damper valve arrangement, comprising:

first and second flow paths in said arrangement, the first flow path being controlled as a non-return valve and the second flow path being controlled with a damping action;

a liftable rotary slide valve rotationally adjustable as a function of temperature;

a second valve element providing a damping action; and wherein said liftable rotary slide valve closes or opens in a non-return direction, the first flow path and/or a bypass via a rotational adjustment.

18. The damper valve according to claim 17, further comprising a bimetallic component coupled to rotationally adjust the rotary slide valve as a function of temperature.

19. The damper valve according to claim 18, wherein the bimetallic component is a bimetallic lever.

20. The damper valve according to claim 18, wherein the bimetallic component is a bimetallic spring.

* * * * *